US012589885B2

(12) United States Patent
Leuschner et al.

(10) Patent No.: US 12,589,885 B2
(45) Date of Patent: Mar. 31, 2026

(54) AIRCRAFT HEADLIGHT AND AIRCRAFT COMPRISING AN AIRCRAFT HEADLIGHT

(71) Applicant: Goodrich Lighting Systems GmbH & Co. KG, Lippstadt (DE)

(72) Inventors: Jens Leuschner, Möhnesee (DE); Anil Kumar Jha, Lippstadt (DE); Andre Hessling-von Heimendahl, Koblenz (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 18/976,750

(22) Filed: Dec. 11, 2024

(65) Prior Publication Data

US 2025/0197022 A1     Jun. 19, 2025

(30) Foreign Application Priority Data

Dec. 15, 2023     (EP) .................................... 23217304

(51) Int. Cl.
 *B64D 47/04*     (2006.01)
 *B60Q 1/05*     (2006.01)
 *F21S 8/02*     (2006.01)
(52) U.S. Cl.
 CPC ................ *B64D 47/04* (2013.01); *B60Q 1/05* (2013.01); *F21S 8/028* (2013.01)
(58) Field of Classification Search
 CPC ........ B64D 47/02; B64D 47/04; B64D 47/06; B60Q 1/05; F21S 8/028
 See application file for complete search history.

(56) References Cited

U.S. PATENT DOCUMENTS

| | | | | |
|---|---|---|---|---|
| 2,105,137 A | * | 1/1938 | Bruner ................... | B64D 47/04 |
| | | | | 362/472 |
| 2,510,818 A | * | 6/1950 | Grimes ................. | B64D 47/04 |
| | | | | 74/411 |

(Continued)

FOREIGN PATENT DOCUMENTS

| | | | | |
|---|---|---|---|---|
| CN | 201328043 Y | * | 10/2009 | |
| CN | 110733406 A | * | 1/2020 | ............... B60Q 1/04 |

(Continued)

OTHER PUBLICATIONS

European Patent Office, European Search Report dated May 3, 2024 in Application No. 23217304.7.

*Primary Examiner* — Alexander K Garlen
(74) *Attorney, Agent, or Firm* — SNELL & WILMER L.L.P.

(57)     ABSTRACT

An aircraft headlight comprises a housing; a retractable light emission unit, wherein the retractable light emission unit is movable with respect to the housing between a stowed position and an operating position; and an electric motor. The electric motor comprises a casing, which is stationary with respect to the housing; a rotor, which is rotatable with respect to the casing and which is mechanically coupled to the retractable light emission unit for moving the retractable light emission unit between the stowed position and the operating position by rotating the rotor; at least one stationary magnet, which is attached to the casing; and at least one moving permanent magnet, which is attached to the rotor such that, in at least one rotational position of the rotor, the at least one moving permanent magnet is located vis-à-vis the at least one stationary magnet.

16 Claims, 7 Drawing Sheets

(56)     References Cited

U.S. PATENT DOCUMENTS

| | | | | |
|---|---|---|---|---|
| 3,579,003 | A | * | 5/1971 | Gray .................... H02K 49/108 |
| | | | | 310/93 |
| 5,023,760 | A | * | 6/1991 | Izuno ................... B60Q 1/2692 |
| | | | | 362/526 |
| 5,285,359 | A | * | 2/1994 | Czipri .................... B63B 45/04 |
| | | | | 362/477 |
| 5,355,131 | A | | 10/1994 | Metz |
| 5,751,127 | A | * | 5/1998 | Austin ................... H02K 11/21 |
| | | | | 310/104 |
| 8,058,757 | B2 | | 11/2011 | Himmelmann |
| 9,719,607 | B2 | | 8/2017 | Lenz |
| 11,192,494 | B2 | * | 12/2021 | Giffen ................... F21S 41/657 |
| 2018/0016030 | A1 | * | 1/2018 | Hessling-Von Heimendahl ......... |
| | | | | A01M 29/10 |
| 2022/0017236 | A1 | | 1/2022 | Hessling-Von Heimendahl et al. |

FOREIGN PATENT DOCUMENTS

| | | | | | |
|---|---|---|---|---|---|
| CN | 115560293 | | 1/2023 | | |
| DE | 102007021773 | A1 * | 12/2007 | ............ | F21S 41/255 |
| DE | 102013009311 | A1 * | 6/2014 | ............ | B60R 21/34 |
| EP | 1046216 | | 6/2006 | | |
| FR | 2978425 | A1 * | 2/2013 | ............ | B64D 47/04 |
| GB | 533034 | | 2/1941 | | |
| JP | 2018183042 | A * | 11/2018 | ............ | H02K 21/14 |

* cited by examiner

AIRCRAFT HEADLIGHT AND AIRCRAFT COMPRISING AN AIRCRAFT HEADLIGHT

CROSS-REFERENCE TO RELATED APPLICATIONS

This application claims priority to EP Patent Application No. 23217304.7, filed Dec. 15, 2023 and titled "AIRCRAFT HEADLIGHT AND AIRCRAFT COMPRISING AN AIR-CRAFT HEADLIGHT," which is incorporated by reference herein in its entirety for all purposes.

FIELD

The present invention is in the field of exterior aircraft lighting. In particular, the present invention is in the field of aircraft headlights and aircraft comprising aircraft headlights.

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior aircraft lights are navigation lights, also referred to as position lights, red-flashing beacon lights, white strobe anti-collision lights, wing scan lights, take-off lights, landing lights, taxi lights, runway turn-off lights, etc. Take-off lights, landing lights, taxi lights, and runway turn-off lights are often jointly referred to as aircraft headlights.

Exterior aircraft lights are heavily space-constrained, because space is a highly scarce resource within the aircraft body. The space concerns are particularly worrisome in aircraft headlights for a number of reasons. Aircraft head-lights tend to be larger than other kinds of exterior aircraft lights, because they provide a comparably high light inten-sity, which leads to comparably large light generation, light conditioning, and cooling arrangements. Also, aircraft head-lights tend to be installed in space-sensitive portions of the aircraft. For example, they may be mounted to the aircraft running gears, thus occupying valuable space in the running gear compartments of the aircraft when folded away during flight. In other implementations, aircraft headlights are pro-vided in the wings or in the wing roots of the aircraft, where space is also a highly scarce resource. The space concerns are particularly pressing in high speed aircraft, which have a very small front surface area and very thin wings. The challenge in such high speed aircraft is further aggravated by the fact that the aircraft headlights need a high mechanical stability due to the high speeds of the aircraft.

For providing an aircraft headlight that combines a low space envelope with high mechanical stability, when in the operating position, an aircraft headlight may be a retractable aircraft headlight, i.e. an aircraft headlight comprising a retractable light emission unit, which is movable between a stowed position and an operating position. In order to allow for safe and reliable operation of the retractable aircraft headlight, it is desired that the retractable light emission unit is firmly held in the stowed position and/or the operating position for preventing an uncontrolled movement of the retractable light emission unit.

It would therefore be beneficial to provide a retractable aircraft headlight that has a reliable braking mechanism, which allows for reliably and releasably holding the retract-able light emission unit in its stowed position and/or in its operating position. Also, it would be beneficial to provide an aircraft equipped with such an aircraft headlight.

SUMMARY

Exemplary embodiments of the invention include an aircraft headlight, comprising a housing; a retractable light emission unit including at least one light source, wherein the retractable light emission unit is movable with respect to the housing between a stowed position and an operating posi-tion; and an electric motor for moving the retractable light emission unit between its stowed position and its operating position. The electric motor comprises: a casing, which is stationary with respect to the housing; a rotor, which is rotatable with respect to the casing and which is mechani-cally coupled to the retractable light emission unit for moving the retractable light emission unit between the stowed position and the operating position by rotating the rotor; at least one stationary magnet, which is attached to the casing; and at least one moving permanent magnet, which is attached to the rotor. The at least one moving permanent magnet is attached to the rotor in a configuration, in which, in at least one rotational position of the rotor, the at least one moving permanent magnet is located vis-à-vis the at least one stationary magnet. The at least one stationary magnet and the at least one moving permanent magnet have such polarities that the at least one stationary magnet and the at least one moving permanent magnet exert a magnetic hold-ing force onto the rotor, when the at least one moving permanent magnet is located vis-à-vis the at least one stationary magnet.

Exemplary embodiments of the invention further include a method of moving retractable light emission unit of an aircraft headlight according to an exemplary embodiment of the invention between the stowed position and the operating position, wherein the method includes operating the electric motor for rotating the rotor from a start position, which corresponds to the stowed position of the retractable light emission unit, into an end position, which corresponds to the operating position of the retractable light emission unit; and/or operating the electric motor for rotating the rotor from a start position, which corresponds to the operating position of the retractable light emission unit into the end position, which corresponds to the stowed position of the retractable light emission unit. In at least one of the start position and the end position, the at least one moving permanent magnet is arranged vis-à-vis the at least one stationary magnet.

Exemplary embodiments of the invention allow for reli-ably and releasably holding the retractable light emission unit in its stowed position and/or in its operating position, respectively. The magnetic interaction between the at least one stationary magnet and the at least one moving perma-nent magnet results in a magnetic holding force, which exerts a braking force onto the rotor. This braking force may prevent the rotor from rotating, when the electric motor is not operated. By selecting the magnetic properties and/or the numbers of the magnets in a suitable manner, the magnetic holding force may be set for reliably holding the retractable light emission unit in its stowed position and/or for holding the retractable light emission unit in its operating position, respectively, at least under normal operational circum-stances. Simultaneously, the magnetic holding force may be set such that it can be overcome by the torque of the electric motor, when the electric motor is operated for moving the retractable light emission unit between its stowed position and its operating position.

An aircraft headlight according to an exemplary embodiment of the invention may be implemented without any active control for braking the retractable light emission unit in its stowed position and/or in its operating position. Also, a braking mechanism of a retractable aircraft headlight with magnets, as provided according to exemplary embodiments of the invention, does not considerably reduce the efficiency of the electric motor. It further adds only a small amount of additional weight, and it may be implemented at low costs.

The aircraft headlight comprises a housing. The housing is a structure that is mountable to the aircraft and that is stationary within the aircraft frame of reference. The housing may have a mounting structure, such as a mounting ring, with which it may be fixed to the aircraft, in particular to the skin of the aircraft fuselage/aircraft wings/aircraft wing roots.

The aircraft headlight has a retractable light emission unit. The retractable light emission unit is configured to provide an aircraft headlight light output in operation. The retractable light emission unit may have various functional components of the aircraft headlight, such as one or more light sources, one or more light conditioning elements/optical elements, cooling means, etc., as will be laid out in more detail below.

According to a further embodiment, the distance between the at least one stationary magnet and the at least one moving permanent magnet is in the range of between 0.3 mm and 4 mm, when the at least one moving permanent magnet is located vis-à-vis the at least one stationary magnet. The distance may, in particular, be in the range of between 0.5 mm and 2 mm. A distance between the moving permanent magnet and the at least one stationary magnet in the range of between 0.3 mm and 4 mm, in particular in the range of between 0.5 mm and 2 mm, when the at least one moving permanent magnet is located vis-à-vis the at least one stationary magnet, has been found as suitable for generating a braking force that is sufficiently strong for preventing an undesired movement of the retractable light emission unit, when it is arranged in its stowed position or in its operating position, respectively. At the same time, the braking force has been found to be sufficiently small to be overcome conveniently by the torque generated by the electric motor, when the electric motor is activated.

According to a further embodiment, the at least one stationary magnet comprises or is at least one stationary permanent magnet. By employing at least one stationary permanent magnet, a very straightforward implementation of the magnetic interaction between the at least one moving permanent magnet and the at least one stationary magnet may be achieved. The magnetic interaction may take place without any power supply to the magnets and without any kind of outside triggering/control. The at least one stationary permanent magnet and the at least one moving permanent magnet may provide the magnetic holding force in a particularly straightforward and reliable manner.

According to a further embodiment, the at least one stationary magnet comprises or is at least one stationary electromagnet. By employing at least one stationary electromagnet, the magnetic interaction between the at least one moving permanent magnet and the at least one stationary magnet may be selectively switched on and off. In this way, the influence on the operation of the electric motor may be switched off, which may lead to a particularly well-balanced operation of the electric motor. The at least one stationary electromagnet may receive power from any suitable power supply. For example, the at least one stationary electromagnet may be coupled to the dedicated power supply of the electric motor. It may also be coupled to the general power supply of the aircraft headlight. In general, the at least one stationary electromagnet may be coupled to any suitable point in the circuit architecture of the aircraft headlight where power can be diverted.

According to a further embodiment, the magnetic interaction between the at least one moving permanent magnet and the at least one stationary magnet is continuously present in said at least one rotational position of the rotor where the at least one moving permanent magnet is located vis-a-vis the at least one stationary magnet. In case the at least one stationary magnet comprises or is at least one stationary permanent magnet, the continuous magnetic interaction between permanent magnets is present by definition. In case the at least one stationary magnet comprises or is at least one stationary electromagnet, the continuous magnetic interaction may be achieved by continuously supplying power to the at least one stationary electromagnet, when the magnetic holding force is desired. Accordingly, the aircraft headlight may be configured to continuously provide power to the at least one stationary electromagnet, when the at least one moving permanent magnet is located vis-a-vis the at least one stationary electromagnet for providing the magnetic holding force.

According to a further embodiment, the magnetic interaction between the at least one moving permanent magnet and the at least one stationary magnet takes place, at least partially, outside of the casing of the electric motor. In particular, the magnetic circuit that is formed by the at least one moving permanent magnet and the at least one stationary magnet, when the at least one moving permanent magnet is located vis-a-vis the at least one stationary electromagnet, extends at least partially outside of the casing of the electric motor. In this way, the magnetic interaction may provide for the magnetic holding force, while keeping the influence on the operation of the electric motor within the casing of the electric motor low.

According to a further embodiment, the at least one stationary magnet is mounted to an outer surface of the casing of the electric motor. This may allow for adding the at least one stationary magnet to an existing electric motor without opening the casing of the electric motor.

According to a further embodiment, the at least one moving permanent magnet is mounted to a portion of the rotor, which is outside of the casing. The at least one moving permanent magnet may, in particular, be mounted to a rotational shaft protruding from the casing or to a component attached to the rotational shaft where it is protruding from the casing. Arranging the at least one moving permanent magnet outside of the casing may allow for an efficient magnetic interaction between the at least one moving permanent magnet and at least one stationary magnet, which is mounted to an outer surface of the casing of the electric motor. While the at least one stationary magnet and the at least one moving permanent magnet may be arranged outside of the casing of the electric motor, they may still be protected from the environment within the aircraft body. In particular, they may be arranged freely in the inner space of the housing of the aircraft headlight, or they may be arranged under a separate cover which is attached to the casing of the electric motor and/or attached to the housing of the aircraft headlight.

According to a further embodiment, the rotor comprises a rotating disk, which is supported by a rotational shaft of the rotor, protruding from the motor. The rotating disk is arranged for rotating integrally with the rotor. The rotating disk supports the at least one moving permanent magnet. The rotating disk may, in particular, extend perpendicular to a rotational axis of the rotor. A rotating disk, which rotates integrally with the rotor, may provide a particularly good structure for mounting the at least one moving permanent magnet. The rotating disk may in particular allow for arranging the at least one moving permanent magnet in some radial distance from the rotational shaft. Arranging the at least one moving permanent magnet in some radial distance from the rotational shaft may allow for increasing the braking torque, which is exerted onto the rotor by the magnetic force, which is generated between the at least one moving permanent magnet and the at least one stationary magnet.

According to a further embodiment, the rotating disk is formed integrally with the rotational shaft. Alternatively, the rotating disk may be manufactured separately from the rotational shaft and be mounted to the rotational shaft.

According to a further embodiment, the rotating disk is formed of a synthetic material, for example polyamide. A rotating disk made of a synthetic material may have a large rigidity, which may prevent an undesirable deformation of the rotating disk. A rotating disk, which is made of a synthetic material, may further have a small weight and a small inertia, reducing the additional torque, which is to be provided by the electric motor for accelerating the rotating disk.

According to a further embodiment, the electric motor comprises a single stationary magnet and two moving permanent magnets. In such a set-up, there are two rotational positions of the rotor, where a particular moving permanent magnet is located vis-a-vis the stationary magnet.

According to a further embodiment, a first moving permanent magnet of the two moving permanent magnets may be arranged vis-à-vis the single stationary magnet, when the retractable light emission unit is arranged in the stowed position. A second moving permanent magnet of the two moving permanent magnets may be arranged vis-à-vis the single stationary magnet, when the retractable light emission unit is arranged in the operating position.

In such a configuration, the retractable light emission unit may be held in the stowed position by the magnetic interaction between the first moving permanent magnet and the stationary magnet, and the retractable light emission unit may be held in the operating position by the magnetic interaction between the second moving permanent magnet and the stationary magnet.

Depending on the gearing set-up between the electric motor and the retractable light emission unit, it is also possible that either one of the two moving permanent magnets may be located vis-a-vis the stationary magnet in the stowed position and the operating position of the retractable light emission unit. This may be the case, when the gearing ratio is so high that both rotational positions of the rotor, where one of the two moving permanent magnets is located vis-a-vis the stationary magnet, result in a suffi-ciently close approximation of the perfect/nominal stowed and operating positions. With these considerations in mind, it is also possible to provide the electric motor with a single stationary magnet and a single moving permanent magnet. In this case, there is only one rotational position of the rotor, where the single moving permanent magnet is located vis-a-vis the single stationary magnet.

Irrespective of the correspondence between the locations of the moving permanent magnets and the operating/stowed positions of the retractable light emission unit, mounting two permanent magnets to the rotating disk may result in a comparably even weight distribution on the rotating disk, keeping the imbalance introduced by the moving permanent magnets low.

According to an alternative embodiment, two stationary magnets may be attached to the casing of the electric motor, and a single moving permanent magnet may be mounted to the rotor, in particular to a rotating disk of the rotor. In such a configuration, the retractable light emission unit may be fixed in the stowed position by the magnetic interaction between the moving permanent magnet and a first stationary magnet, and the retractable light emission unit may be fixed in the operating position by the magnetic interaction between the moving permanent magnet and a second sta-tionary magnet. The above considerations for other corre-spondences between the locations of the magnets and the operating/stowed positions of the retractable light emission unit apply in an analogous manner.

According to a further embodiment, the electric motor comprises two stationary magnets, which are attached to the casing, and two moving permanent magnets, which are mounted to the rotor, in particular to a rotating disk of the rotor.

According to a further embodiment, the aircraft headlight may comprise a plurality of moving permanent magnets and/or a plurality of stationary magnets.

By providing a plurality of moving permanent magnets at the rotor, the additional mass added to the rotor by the moving permanent magnets may be distributed more evenly around the rotor, thus further reducing the imbalance of the rotor, which may be caused by mounting the at least one moving permanent magnet to the rotor.

Further, by employing a plurality of moving permanent magnets and a plurality of stationary magnets, the braking force/braking torque, which is exerted onto the rotor, may be increased. In other words, if the number of magnets is increased, smaller and weaker magnets may be sufficient for providing a desired total braking force/braking torque.

The plurality of moving permanent magnets may, for example, include two, three, four, five, six, seven, eight or more moving permanent magnets.

The plurality of stationary magnets may, for example, include two, three, four, five, six, seven, eight or more stationary magnets.

In an embodiment comprising a plurality of moving permanent magnets and/or a plurality of stationary magnets, not all moving permanent magnets need to be located vis-à-vis a corresponding stationary magnet when the retractable light emission unit is arranged in its operating position and/or when the retractable light emission unit is arranged in its stowed position, respectively.

In this context, it is noted that the language of the at least one moving permanent magnet being located vis-a-vis the at least one stationary magnet means that there is at least one pair of a moving permanent magnet and a stationary magnet that are located vis-a-vis. It does not mean that all of the at least one moving permanent magnet and the at least one stationary magnet need to have a vis-a-vis partner. It is possible that some magnets have a vis-a-vis partner and other magnets do not have a vis-a-vis partner. It can also be said that, in at least one rotational position of the rotor, at least one of the at least one moving permanent magnet is located vis-a-vis at least one of the at least one stationary magnet.

The moving permanent magnets may, in particular, comprise a first group of moving permanent magnets, which are located vis-à-vis the stationary magnets of a corresponding first group of stationary magnets, when the retractable light emission unit is arranged in its stowed position. Further, the moving permanent magnets may comprise a second group of moving permanent magnets, which are located vis-à-vis the stationary magnets of a corresponding second group of stationary magnets, when the retractable light emission unit is arranged in its operating position.

The first and second groups of magnets may comprise the same number of permanent magnets. Alternatively, the first group of magnets may comprise a different number of magnets than the second group of magnets.

According to a further embodiment, the plurality of moving permanent magnets are arranged at equal angular distances with respect to a rotational axis of the rotor. Such a configuration may contribute to keeping the imbalance of the rotor, which is caused by mounting the plurality of moving permanent magnets to the rotor, low.

According to a further embodiment, the plurality of moving permanent magnets are arranged at different angular distances with respect to a rotational axis of the rotor. The angular positions of the moving permanent magnets may in particular be adapted to correspond to the stowed position and to the operating position of the retractable light emission unit with particularly high accuracy.

Analogously, the plurality of stationary magnets may be arranged at equal angular distances with respect to the rotational axis of the rotor or may be arranged at different angular distances with respect to the rotational axis of the rotor.

According to a further embodiment, the aircraft headlight comprises a reduction gear, with the rotor of the electric motor being mechanically coupled to the retractable light emission unit via the reduction gear. The reduction gear may be configured for reducing the rotational speed of the rotor and for increasing the torque provided by the rotor. In consequence, the use of a reduction gear may allow for employing a small, fast rotating electric motor for moving the retractable light emission unit between the stowed position and the operating position. When employing a reduction gear, a comparably small braking force on the side of the electric motor may be sufficient for holding the retractable light emission unit in the stowed position and the operating positions. A low complexity set-up may be made possible where comparably small/comparably weak magnets on the electric motor side of the reduction gear may be sufficient for holding the retractable light emission unit in the stowed position and the operating position, respectively.

According to a further embodiment, the electric motor is configured for rotating with a rotational speed in the range of between 2000 rpm and 10000 rpm, in particular with a rotational speed in the range of between 4000 rpm and 8000 rpm; the electric motor may further in particular be configured for rotating with a rotational speed of 6000 rpm.

According to a further embodiment, the reduction gear may have a reduction ratio in the range of between 1:100 and 1:1000. The reduction gear may in particular have a reduction ratio of between 1:300 and 1:700, Further in particular, the reduction gear may have a reduction ratio of about 1:500. A reduction ratio in this range has been found as particularly suitable for achieving the movement between the stowed position and the operating position of the retractable light emission unit with a small electric motor and for achieving the holding of the retractable light emission unit in the stowed position and the operating position with comparably small magnets.

According to a further embodiment, the reduction gear is arranged on a first side of the electric motor and the at least one stationary magnet and the at least one moving permanent magnet are arranged on an opposite second side of the electric motor. In other words, the reduction gear and the combination of the at least one stationary magnet and the at least one moving permanent magnet may be arranged on opposite sides of the electric motor. The reduction gear may in particular be arranged on a first side of the casing, and the at least one stationary magnet may be attached to the casing at a second side of the casing, which is opposite to the first side.

A configuration, in which the reduction gear is arranged on a first side of the electric motor and the at least one stationary magnet and the at least one moving permanent magnet are arranged on a second side of the electric motor, may allow for a compact aircraft headlight. It may further allow for preventing interference between the reduction gear and the magnets.

In case the aircraft headlight comprises a rotating disk, the reduction gear and the rotating disk may be arranged on opposite sides of the electric motor.

According to a further embodiment, the aircraft headlight comprises a crankshaft. The crankshaft may be coupled to the electric motor, in particular to the rotor of the electric motor, and to the retractable light emission unit via a connecting rod. The electric motor may be configured for moving the retractable light emission unit between the stowed position and the operating position via the crankshaft and the connecting rod. A crankshaft, which is coupled to the electric motor and to the retractable light emission unit via a connecting rod provides an efficient means for transferring a rotation of the rotor into a pivotable motion of the retractable light emission unit.

The expression of the crankshaft being coupled to the retractable light emission unit via a connecting rod means that a connecting rod is present between the crankshaft and the retractable light emission unit. This connecting rod may be the single connecting element between the crankshaft and the retractable light emission unit. However, it is also possible that the coupling comprises other elements besides the connecting rod. The crankshaft may, for example, be coupled to the retractable light emission unit by two connecting rods, which have a bell crank interposed therebetween. Such an arrangement is also understood as falling under the expression of the crankshaft being coupled to the retractable light emission unit via a connecting rod.

According to a further embodiment, the crankshaft has a crankpin, to which the connecting rod is coupled. As stated above, the connecting rod may in turn be coupled directly to the retractable light emission unit or via other elements. The crankpin is understood as that part of the crankshaft that rotates eccentrically with respect to the axis of rotation of the crankshaft. The crankpin may extend through a bore/through an eye of the connecting rod at a first end portion thereof. The crankpin may also be referred to as a connecting rod journal.

The crankpin may be substantially in its first dead center, also referred to as the first dead point, when the retractable light emission unit is in the stowed position. In addition/alternatively, the crankpin may be substantially in its second dead center, also referred to as the second dead point, when the retractable light emission unit is in the operating position.

By associating the stowed position and/or the operating position with the first dead center and/or the second dead center of the crankpin, a particularly stable resting of the retractable light emission unit in the stowed position and/or in the operating position may be achieved. The first dead center and the second dead center are those positions of the crankpin where the highest torque/force is required for moving the connecting rod and the crankshaft. The arrangement of the crankshaft and the connecting rod help the retractable light emission unit to withstand external forces and to maintain the desired position. The first dead center may also be referred to as the upper dead center/upper dead point, and the second dead center may also be referred to as the lower dead center/lower dead point. The expressions of upper dead center and lower dead center may correspond to the orientation of the aircraft headlight, when installed at the bottom of a wing/wing root/fuselage of the aircraft.

According to a further embodiment, the retractable light emission unit comprises a base plate, which is pivotable with respect to the housing. The base plate may support various functional components of the retractable light emission unit. In particular, the base plate may support one or more light sources, one or more light conditioning elements/optical elements, such as one or more reflectors and/or one or more lenses and/or one or more shutters. The base plate may further support a cover arrangement, protecting functional components of the retractable light emission unit from the outside environment and allowing the light output of the retractable light emission unit to leave the aircraft headlight. Further, the base plate may support cooling means, such as cooling ribs and/or other cooling elements, and/or may support power supply components, such as power supply connections to the one or more light sources.

The base plate may comprise a fixed portion, which is coupled to the housing, and a movable portion. The fixed portion may be fixed to the housing in any suitable manner, such as via a suitable hinge. The movable portion may move freely with respect to the housing, constrained by the stroke of the connecting rod, which in turn is coupled to the crankshaft. The crankshaft may be coupled to the movable portion of the base plate via the connecting rod.

The base plate may be positioned within the housing, when the retractable light emission unit is in the stowed position, and may be substantially flush with the skin of the aircraft, when the retractable light emission unit is in the operating position. In addition to being constrained by the stroke of the connecting rod, the base plate may move between two stops of the housing. The stops may be implemented as abutment surfaces, such that the base plate engages with the housing in a well-defined manner in the stowed position and in the operating position.

According to a further embodiment, the connecting rod is substantially orthogonal with respect to the base plate, when the retractable light emission unit is in the operating position. In particular, the connecting rod may be at an angle of between 80° and 100°, further in particular at an angle of between 85° and 95°, yet further in particular at an angle of between 88° and 92°, yet further in particular at an angle of about 90°, with respect to the base plate, when the retractable light emission unit is in the operating position. The expression of the connecting rod being substantially orthogonal with respect to the base plate, when the retractable light emission unit is in the operating position, is understood as the connecting rod being in the above mentioned angular range with respect to the base plate. When the connecting rod is in a substantially orthogonal position with respect to the base plate, a comparably large force is required for starting the connecting rod and, thus, the crankshaft to move. In this way, a comparably large holding force is present at the base plate, helping to keep the retractable light emission unit in the operating position.

According to a further embodiment, the aircraft headlight comprises a bell crank, wherein the crankshaft is coupled to the bell crank via a first connecting rod and wherein the bell crank is coupled to the movable portion of the base plate via a second connecting rod. The bell crank may have two lever portions, which may be embodied as two legs. With the two lever portions, the torque may be adapted between the first connecting rod and the second connecting rod. In this way, a particularly suitable holding force may be set and applied to the retractable light emission unit, when in the stowed position and/or when in the operating position. Also, with the bell crank, the stroke orientation may be changed between the first connecting rod and the second connecting rod. In this way, the electric motor and the crankshaft may be positioned closer to the retractable light emission unit, and an overall even more compact design of the aircraft headlight may be achieved. In particular, an aircraft headlight with an even smaller height extension may become possible.

According to a further embodiment, the first connecting rod is substantially aligned with the base plate, when the retractable light emission unit is in the operating position. In particular, the first connecting rod may be oriented at an angle of between −20° and 20°, in particular at an angle of between −10° and 10°, with respect to the base plate, when the retractable light emission unit is in the operating position. The expression of the first connecting rod being substantially aligned with the base plate is understood as the first connecting rod having an orientation within the mentioned angular range. With the first connecting rod being arranged in this manner, a particularly low height dimension of the aircraft headlight may be achieved. According to a further embodiment, the base plate is hinged with respect to the housing with a spring steel sheet. By using a spring steel sheet as the hinge between the base plate and the housing, traditional types of hinges, such as hinges with hinge pins, may be eliminated. By eliminating such conventional hinges, common failures, such as breaking hinge pins, can be prevented. The spring steel sheet may in particular be a bendable spring steel sheet.

The spring steel sheet may abut the base plate with a first portion of the spring steel sheet and may abut a wall of the housing with a second portion of the spring steel sheet. The first portion and the second portion of the spring steel sheet may be mounted to the base plate and the housing, respectively. In this way, the spring steel sheet may have an extended surface, over which the spring steel sheet is mounted to the base plate and to the wall of the housing, respectively.

According to a further embodiment, the spring steel sheet is bent at a bending line, when the retractable light emission unit is moved between the stowed position and the operating position. The bending line may form the pivot axis along which the base plate is pivotable with respect to the housing. The bending line may be the border between the above mentioned first and second portions of the spring steel sheet. The bending line may separate the spring steel sheet in two portions of substantially equal size. In this way, equal or similar abutment/mounting surfaces may be available for attaching the spring steel sheet to the base plate and to the housing.

According to a further embodiment, the bending angle between the first portion of the spring steel sheet and the second portion of the spring steel sheet changes by less than 30°, in particular by between 10° and 30°, when the retractable light emission unit is moved between the stowed position and the operating position. In this way, the repeated bending of the spring steel sheet during extended operation of the aircraft headlight may be below the fatigue limit of the spring steel sheet. This in turn may allow for the hinging with the spring steel sheet to work in a highly reliable and highly durable manner.

According to a further embodiment, the spring steel sheet is made from spring steel, which is known to the skilled person as a common material for steel springs.

According to a further embodiment, the base plate is vertically hinged with respect to the housing. In particular, the base plate may be hinged on a wall of the housing that is oriented substantially vertically in the mounted position of the aircraft headlight. The base plate being vertically hinged may mean that the spring steel sheet is bent at an angle of between 60° and 120°, in particular at an angle of between 70° and 110°, further in particular at an angle of between 80° and 100°, when the retractable light emission unit is in the operating position.

According to a further embodiment, the base plate is horizontally hinged with respect to the housing. In particular the base plate may be hinged on a wall of the housing that is oriented substantially horizontally in the mounted position of the aircraft headlight. The base plate being horizontally hinged may mean that the spring steel sheet is stretched out in a substantially flat manner, when the retractable light emission unit is in the operating position. In particular, the spring steel sheet may have a bending angle of less than 20°, in particular of less than 10°, at the bending line.

According to a further embodiment, the base plate may be forward hinged or rearward hinged. In other words, it is possible that the forward end portion of the base plate is the fixed portion of the base plate and the rearward end portion of the base plate is the movable portion of the base plate, and it is possible that the forward end portion of the base plate is the movable portion of the base plate and the rearward end portion of the base plate is the fixed portion of the base plate. For both the forward hinged arrangement and the rearward hinged arrangement, it is possible that the base plate is vertically hinged or horizontally hinged.

According to a further embodiment, the retractable light emission unit comprises at least one light source and at least one optical element, wherein the at least one light source and the at least one optical element are arranged to provide an aircraft headlight light output in operation. The at least one optical element may in particular be at least one reflector. In general, the at least one optical element may comprise one or more reflectors and/or one or more lenses and/or one or more shutters. It is possible that the retractable light emission unit comprises a plurality of building blocks, wherein each building block comprises a light source and an optical element, such as a light source and a reflector.

According to a further embodiment, the at least one light source is at least one LED.

According to a further embodiment, the retractable light emission unit comprises a cover arrangement, arranged over the at least one light source and the at least one optical element, wherein the cover arrangement comprises a light transmissive cover portion for passing the aircraft headlight light output in operation. The light transmissive cover portion may be a forward cover portion, passing the aircraft headlight light output in a forward direction. The cover arrangement may further comprise a rearward cover portion. The rearward cover portion may also be light transmissive or may be opaque.

According to a further embodiment, the cover arrangement is shaped to be substantially flush with an outer skin of the aircraft, to which the aircraft headlight is mounted, when the retractable light emission unit is in the stowed position.

According to a further embodiment, the housing is sized and shaped to fit into a recess in an aircraft wing and/or into a recess in an aircraft wing root and/or into a recess in an aircraft fuselage of an aircraft.

According to a further embodiment, the aircraft headlight is a take-off light or a landing light or a runway turn-off light or a taxi light or a multi-functional aircraft headlight, comprising the functionalities of at least two of a take-off light, a landing light, a runway turn-off light and a taxi light. The multi-functional aircraft headlight may in particular comprise the functionalities of any two or any three or all four of a take-off light, a landing light, a runway turn-off light and a taxi light. In case the aircraft headlight is a take-off light, the retractable light emission unit is configured to provide a take-off light light output in operation. In case the aircraft headlight is a landing light, the retractable light emission unit is configured to provide a landing light light output in operation. In case the aircraft headlight is a runway turn-off light, the retractable light emission unit is configured to provide a runway turn-off light light output in operation. In case the aircraft headlight is a taxi light, the retractable light emission unit is configured to provide a taxi light light output in operation. In case the aircraft headlight is a multi-functional aircraft headlight, the aircraft headlight may have separate lighting systems that provide the respective light outputs.

Exemplary embodiments of the invention further include an aircraft that comprises at least one aircraft headlight, as described in any of the embodiments above. The additional features, modifications and effects, described above with respect to the aircraft headlight, apply to the aircraft in an analogous manner. The aircraft may in particular be an airplane, more in particular a commercial passenger airplane. The aircraft may also be a rotorcraft/helicopter.

According to a further embodiment, the aircraft comprises a wing-mounted aircraft headlight, which is an aircraft headlight as described in any of the embodiments above, wherein the wing-mounted aircraft headlight is mounted to a lower portion of a wing of the aircraft, with the retractable light emission unit being substantially flush with a skin of the lower portion of the wing of the aircraft, when the retractable light emission unit is in the stowed position. The aircraft may in particular comprise a plurality of such wing-mounted aircraft headlights, for example one such wing-mounted aircraft headlight per wing.

According to a further embodiment, the aircraft comprises a wing-root-mounted aircraft headlight, which is an aircraft headlight as described in any of the embodiments above, wherein the wing-root-mounted aircraft headlight is mounted to a lower portion of a wing root of the aircraft, with the retractable light emission unit being substantially flush with a skin of the lower portion of the wing root of the aircraft, when the retractable light emission unit is in the stowed position. The aircraft may in particular comprise a plurality of such wing-root-mounted aircraft headlights, for example one such wing-root-mounted aircraft headlight per wing root.

According to a further embodiment, the aircraft comprises a fuselage-mounted aircraft headlight, which is an aircraft headlight as described in any of the embodiments above, wherein the fuselage-mounted aircraft headlight is mounted to a lower portion of a fuselage of the aircraft, with the retractable light emission unit being substantially flush with a skin of the lower portion of the fuselage of the aircraft, when the retractable light emission unit is in the stowed position. The aircraft may in particular comprise a plurality of such fuselage-mounted aircraft headlights

BRIEF DESCRIPTION OF THE DRAWINGS

Further exemplary embodiments of the invention are described below with respect to the accompanying drawings, wherein.

DETAILED DESCRIPTION

Figure 1:
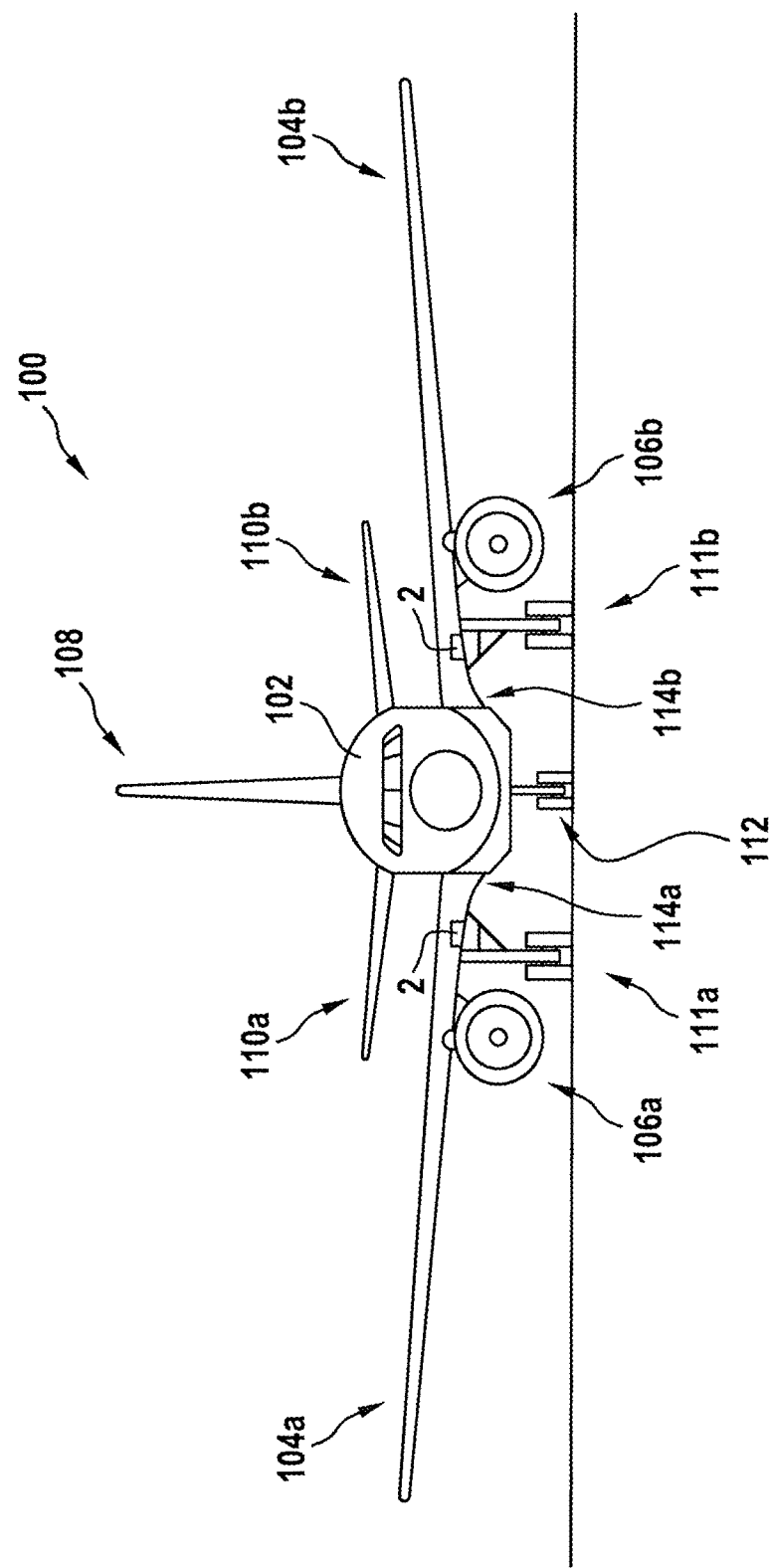
FIG. 1 shows a schematic front view of an aircraft in accordance with an exemplary embodiment of the invention.

FIG. 1 shows a schematic front view of an aircraft 100 in accordance with an exemplary embodiment of the invention. The aircraft 100 comprises two aircraft headlights 2 in accordance with an exemplary embodiment of the invention. The aircraft 100 has a fuselage 102 and two wings 104a, 104b, extending laterally from the right and left sides of the fuselage 102. Each of the wings 104a, 104b supports an engine 106a, 106b. In further exemplary embodiments, which are not depicted in the figures, each of the wings 104a, 104b may support more than one engine. In particular, each of the wings 104a, 104b may support two or more engines. In further embodiments, one or more engines may be mounted to the fuselage 102 as well.

A vertical stabilizer 108 and two horizontal stabilizers 110a, 110b are mounted to a tail portion of the fuselage 102.

The aircraft 100 further comprises a landing gear configuration that includes two main running gears 111a, 111b, which are arranged under the wings 104a, 104b, and a front running gear 112, which is located under a front portion of the fuselage 102. Other landing gear configurations, in particular landing gear configurations comprising more than two main running gears, are possible as well.

An aircraft headlight 2 according to an exemplary embodiment of the invention is mounted to each of the wings 104a, 104b. The aircraft headlights 2 are positioned close to the wing roots 114a, 114b of the wings 104a, 104b. It is pointed out that the aircraft headlights 2 may also be provided at different positions within the aircraft 100, such as at the wing roots 114a, 114b or at the fuselage 102. Also, the aircraft 100 may have more than the depicted two aircraft headlights 2.

Each of the aircraft headlights 2 may be a take-off light, a landing light, a taxi light, a runway turn-off light, or a multi-functional aircraft headlight combining the functionalities of at least two of a take-off light, a landing light, a taxi light, and a runway turn-off light.

It is stressed again that the aircraft headlight configuration, as depicted in FIG. 1, is only exemplary and not limiting. In other words, other aircraft headlight configurations, comprising at least one aircraft headlight in accordance with an exemplary embodiment of the invention, are possible as well. In particular, aircraft headlights in accordance with exemplary embodiments of the invention may be mounted to other components of the aircraft 100 as well.

The aircraft 100 shown in FIG. 1 is an airplane, in particular a large commercial passenger or cargo airplane. It is pointed out that other types of aircraft, such as smaller airplanes, may be equipped with aircraft headlights in accordance with exemplary embodiments of the invention as well. Aircraft headlights according to exemplary embodiments of the invention may also be mounted to helicopters or other types of rotorcraft.

Figure 2:
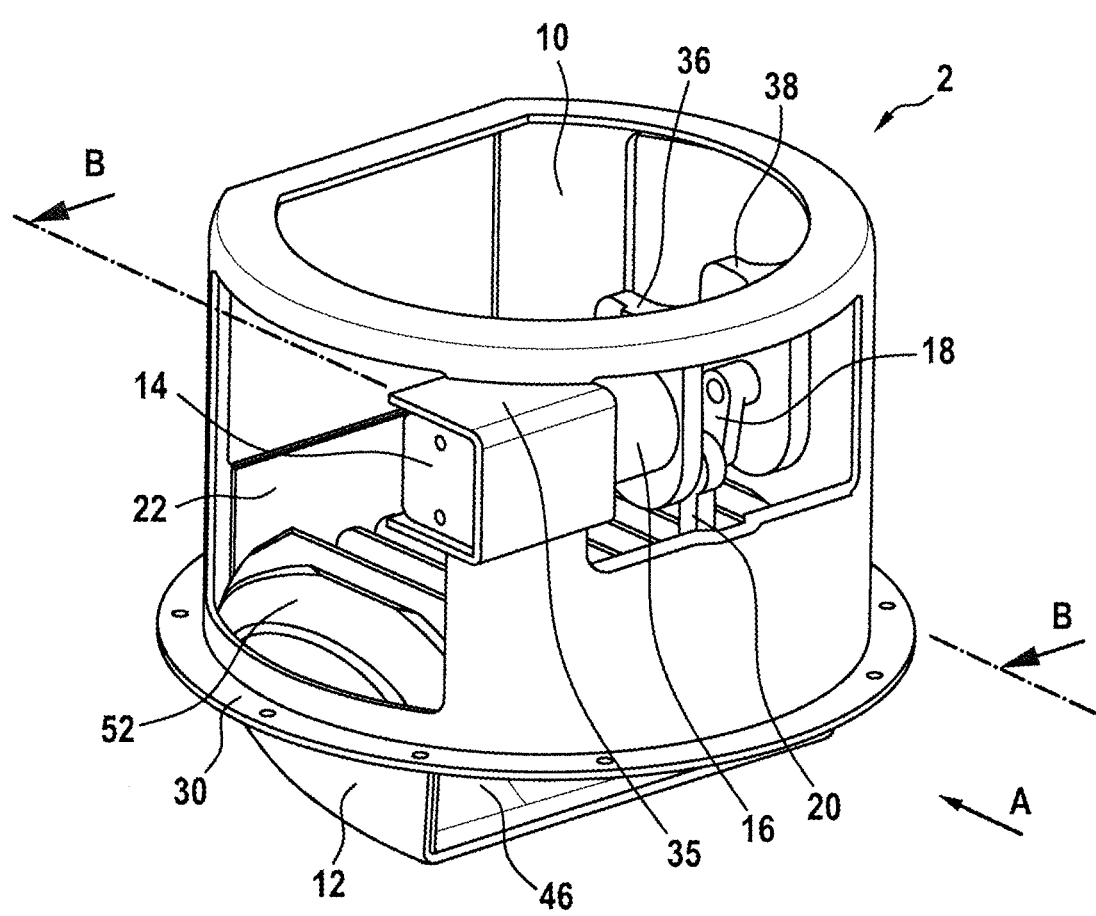
FIG. 2 shows a perspective view of an aircraft headlight in accordance with an exemplary embodiment of the invention, with the retractable light emission unit being in the operating position.

FIG. 2 shows an aircraft headlight 2 in accordance with an exemplary embodiment of the invention in a perspective view. The aircraft headlight 2 may be mounted to an underside of a wing of an aircraft, as is for example shown in FIG. 1. It may also be mounted to an underside of a fuselage of an aircraft or to an underside of a wing root of an aircraft.

The housing 10 has a substantially cylindrical shape, with a rear portion thereof being slightly truncated. The housing 10 may also have a cuboid shape or any other suitable shape. At a lower portion of the housing 10, a mounting ring 30 is provided. The mounting ring 30 has a plurality of mounting holes, distributed around the mounting ring 30. With the mounting holes, the housing and, thus, the aircraft headlight 2 may be mounted to the wing/wing root/fuselage of the aircraft. In particular, the mounting ring 30 may be mounted to a skin of the wing/wing root/fuselage of the aircraft. The mounting may be effected via any suitable mounting means, such as bolts, screws, rivets, etc. When mounted to the aircraft, the portion of the aircraft headlight 2 shown above the mounting ring 30 is provided within the wing/wing root/fuselage of the aircraft and not readily visible from the outside.

In the depicted exemplary embodiment of FIG. 2, the housing 10 does not have a closed outer structure, i.e. the housing 10 does not provide an enclosed inner space. Rather, the housing 10 has various cut-out portions in the side walls and in the top wall. In this way, the housing 10 may be provided at a comparably low weight, and a particularly good air flow for cooling the aircraft headlight 2 may be achieved. However, it is also possible to provide the housing 10 with continuous walls all around, which may lead to an enhanced mechanical stability and an enhanced protection of the components of the aircraft headlight 2.

The housing 10 comprises a motor support bracket 35, to which an electric motor 14 is mounted. In this way, the electric motor 14 is stationary with respect to the housing 10. The housing 10 further comprises a first crankshaft support bracket 36 and a second crankshaft support bracket 38. A reduction gear 16 is interposed between the motor support bracket 35 and the first crankshaft support bracket 36. A crankshaft 18 is arranged between the first crankshaft support bracket 36 and the second crankshaft support bracket 38.

In operation, the electric motor 14 generates a rotational movement, which is passed on to the crankshaft 18 via the reduction gear 16. In this way, the electric motor 14 is configured to rotate the crankshaft 18 in operation. The crankshaft 18 has a crankpin, which is not shown in FIG. 2. In operation, the crankpin may rotate between an upper dead center and a lower dead center.

The reduction gear 16 may have a reduction ratio in the range of between 1:100 and 1:1000. The reduction gear 16 may, in particular, have a reduction ratio of between 1:300 and 1:700. Further in particular, the reduction gear may have a reduction ratio of about 1:500. In consequence, the electric motor 14 may perform a large number of rotations for moving the the retractable light emission unit between the stowed position and the operating position.

The aircraft headlight 2 further comprises a retractable light emission unit 12. The retractable light emission unit 12 is movable between a stowed position, also referred to as a retracted position, and an operating position, also referred to as an extracted position. In FIG. 2, the retractable light emission unit 12 is shown in the operating position, i.e. in the extracted position.

The crankshaft 18 is coupled to the retractable light emission unit 12 via a connecting rod 20. In operation, the electric motor 14 can move the retractable light emission unit 12 between the stowed position and the operating position via the crankshaft 18 and the connecting rod 20. The stowed position of the retractable light emission unit 12 may be associated with the upper dead center of the crankpin of the crankshaft 18, and the operating position of the retractable light emission unit 12 may be associated with the lower dead center of the crankpin of the crankshaft 18.

The retractable light emission unit 12 comprises various functional components. In particular, the retractable light emission unit may comprise light generating means and light conditioning means, as will be described in more detail below. The light generating means and light conditioning means may be protected from the outside environment by a cover arrangement. Said cover arrangement may form the bottom of the retractable light emission unit 12. The cover arrangement has a light transmissive cover portion 46, through which the aircraft headlight light output is emitted in operation. The light transmissive cover portion 46 is the forward cover portion of the cover arrangement.

The retractable light emission unit 12 further comprises a plurality of cooling ribs 52. That plurality of cooling ribs 52 are in heat transfer relationship with the light generating means and are arranged to distribute and transport the heat, as generated during the operation of the aircraft headlight 2, away from the heat generating means.

The aircraft headlight 2 further comprises a spring steel sheet 22. Said spring steel sheet 22 acts as a hinge between the retractable light emission unit 12 and the housing 10. For this purpose, a first portion of the spring steel sheet 22 is attached to the retractable light emission unit 12, and a second portion of the spring steel sheet is attached to the housing 10. More details with respect to said spring steel sheet 22 will be described below.

Figure 3:
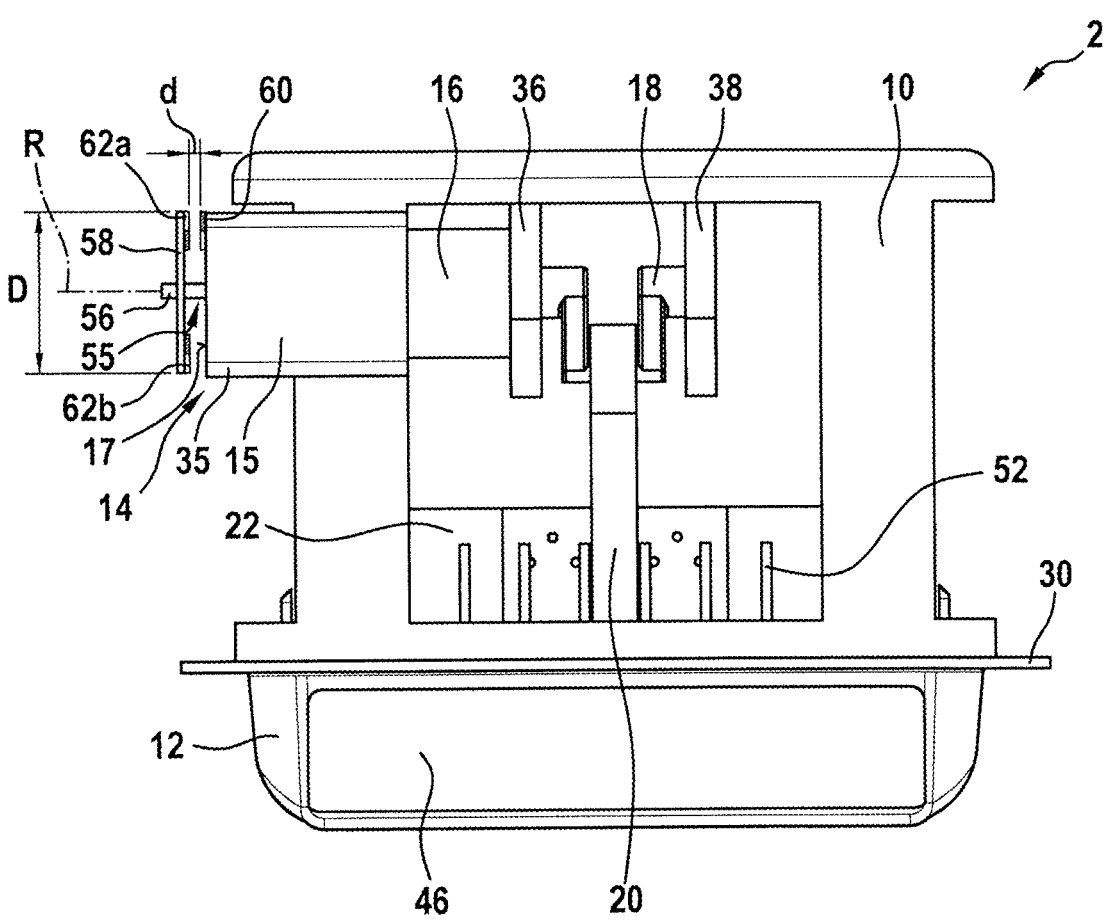
FIG. 3 shows a front view of the aircraft headlight of FIG. 2, with the retractable light emission unit being in the operating position.

FIG. 3 shows a front view of the aircraft headlight 2 depicted in FIG. 2. The viewing direction of FIG. 3 is indicated by arrow A in FIG. 2.

As can be seen in FIG. 3, the light transmissive cover portion 46 of the cover arrangement of the retractable light emission unit 12 is substantially rectangular. Considering that the mounting ring 30 is mountable to the skin of the aircraft, it can be seen from FIG. 3 that the retractable light emission unit 12 has a very low profile, i.e. that the retractable light emission unit 12 is very small in the height dimension. In other words, when in the operating position, the retractable light emission unit 12 extends out of the wing/wing root/fuselage to a very small extent.

Also, it can be seen from FIG. 3 that the connecting rod 20 extends substantially straight down from the crankshaft 18 to the retractable light emission unit 12, with the crankpin of the crankshaft 18 being in the lower dead center, when the retractable light emission unit 12 is in the operating position.

The electric motor 14 has a casing 15, which is mounted to the motor support bracket 35, so that the electric motor 14 is stationary with respect to the housing 10.

The electric motor 14 further comprises a rotor 55, which is rotatable with respect to the casing 15. A large portion of the rotor 55 is located within the casing 15, so that it is not visible in FIG. 3. One end of the rotor 55 is mechanically coupled to the reduction gear 16, which in turn is coupled to the crankshaft 18. In this way, the electric motor 14 is mechanically coupled to the crankshaft 18 for moving the retractable light emission unit 12 between the stowed position and the operating position by rotating the rotor 55. In FIG. 3, the crankshaft 18 is shown on the right side of the electric motor 14.

The rotor 55 comprises a rotational shaft 56, which protrudes from the opposite side of the casing 15, as compared to where the reduction gear 16 and the crankshaft 18 are located. In the view depicted in FIG. 3, the rotational shaft 56 protrudes from the left side of the electric motor 14.

A rotating disk 58 is supported by the rotational shaft 56 for rotating together with the rotor 55. The rotating disk 58 extends perpendicular with respect to the rotational axis R of the rotor 55. The rotating disk 58 may be formed integrally with the rotational shaft 56. Alternatively, the rotating disk 58 may be fixed to the rotational shaft 56 for rotating jointly with the rotational shaft 56. The rotating disk 58 may be formed of a synthetic material, for example of polyamide.

The rotating disk 58 may have a diameter D in the range of between 40 mm and 120 mm, the rotating disk 58 may in particular have a diameter of about 80 mm.

The rotating disk 58 may have a thickness in the range of between 1 mm and 4 mm, in particular of between 2 mm and 3 mm.

At least one stationary magnet 60 is attached to an outer surface 17 of the casing 15. In the exemplary embodiment of FIG. 3, the at least one stationary magnet 60 is at least one stationary permanent magnet 60 and is referred to as such herein. However, it is pointed out that the at least one stationary magnet 60 may also be at least one stationary electromagnet. The at least one stationary electromagnet may receive power from any suitable power supply, such as from any suitable power supply structure within the aircraft headlight 2.

Said outer surface 17 may form an end face of the casing 15 and may face the rotating disk 58. In the depicted exemplary embodiment of FIG. 3, exactly one permanent magnet 60 is attached to the casing 15. Said one permanent magnet 60 is attached towards an upper end of that end face of the casing 15 that faces the rotating disk 58.

At least one moving permanent magnet 62a, 62b is attached to the rotating disk 58. The at least one moving permanent magnet 62a, 62 is positioned in such a manner on the rotating disk 58 that, in at least one rotational position of the rotor 55, the at least one moving permanent magnet 62a, 62b is located vis-à-vis the at least one stationary permanent magnet 60 attached to the casing 15. In the depicted exemplary embodiment of FIG. 3, two permanent magnets 62a, 62b are attached to the rotating disk. In two rotational positions of the rotor 55, a respective one of the two permanent magnets 62a, 62b is located vis-a-vis the one permanent magnet 60.

The at least one stationary permanent magnet 60 and the at least one moving permanent magnet 62a, 62b may have a diameter of between 5 mm and 30 mm, in particular a diameter of between 10 mm and 25 mm.

The magnetic poles of the at least one stationary permanent magnet 60 and of the at least one moving permanent magnet 62a, 62b are provided in a configuration that results in an attractive magnetic force between the at least one stationary permanent magnet 60 and the at least one moving permanent magnet 62a, 62b, when the at least one moving permanent magnet 62a, 62b is located vis-à-vis the at least one stationary permanent magnet 60. In consequence, a braking force, which intends to hold the rotor 55 in its current rotational position, is exerted onto the rotor 55, when the at least one moving permanent magnet 62a, 62b is located vis-à-vis the at least one stationary permanent magnet 60.

As stated above, in the exemplary embodiment depicted in FIG. 3, a single stationary permanent magnet 60 is attached to the casing 15 of the electric motor 14, and two moving permanent magnets 62a, 62b are attached to the rotating disk 58.

In the exemplary embodiment depicted in FIG. 3, the two moving permanent magnets 62a, 62b, which are attached to the rotating disk 58, are spaced apart from each other at an angular distance of 180°. This is, however, only an exemplary configuration. Alternatively, the two moving permanent magnets 62a, 62b may be spaced apart from each other at other angular distances.

The positions of the two moving permanent magnets 62a, 62b on the rotating disk 58 may in particular be set so that a first moving permanent magnet 62a of the two moving permanent magnets 62a, 62b is arranged vis-à-vis the stationary permanent magnet 60, when the retractable light emission unit 12 is arranged in its stowed position, and that a second moving permanent magnet 62b of the two moving permanent magnets 62a, 62b is arranged vis-à-vis the stationary permanent magnet 60, when the retractable light emission unit 12 is arranged in its operating position.

The rotor 55 of the electric motor 14 and, in consequence, the retractable light emission unit 12, which is mechanically coupled to the rotor 55, may be reliably held in the stowed position and in the operating position of the retractable light emission unit 12 by magnetic forces. The magnetic forces may be generated between one of the moving permanent magnets 62a, 62b and the stationary permanent magnet 60, when one of the moving permanent magnets 62a, 62b is located vis-à-vis the stationary permanent magnet 60.

In an alternative embodiment, which is not explicitly shown in the figures, only a single moving permanent magnet may be attached to the rotating disk 58. The position of the single moving permanent magnet on the rotating disk 58 and the position of the stationary permanent magnet 60, mounted to the casing 15 of the electric motor 14, may be set so that the single moving permanent magnet is arranged vis-à-vis the stationary permanent magnet 60, when the retractable light emission unit 12 is arranged in its stowed position and/or when the retractable light emission unit 12 is arranged its operating position.

Due to the reduction gear 16, which is arranged between the rotor 55 of the electric motor 14 and the crankshaft 18, a single rotation of the rotor 55 may result in a very small movement of the crankshaft 18 and, in consequence, to a very small movement of the retractable light emission unit 12. As a result, the magnetic force generated between a single moving permanent magnet and a single stationary permanent magnet 60 may be sufficient for holding the rotor 55 in a rotational position, in which the retractable light emission unit 12 is arranged in its stowed position, and/or in a rotational position, in which the retractable light emission unit 12 is arranged its operating position.

In a further embodiment, a plurality of moving permanent magnets may be attached to the rotating disk 58, and a plurality of stationary permanent magnets may be attached to the casing 15. In this way, the braking force may be increased, which is provided by the magnetic forces acting between the moving permanent magnets and the stationary permanent magnets.

As a result, smaller and weaker permanent magnets may be sufficient for providing a desired total braking force/braking torque.

The at least one stationary permanent magnet 60 and the at least one moving permanent magnet 62a, 62b may be configured for generating a holding force in the range of between 0.1 N and 0.25 N, when the at least one moving permanent magnet 62a, 62b is located vis-à-vis the at least one stationary permanent magnet 60. Depending on the radial position of the at least one moving permanent magnet 62a, 62b on the rotating disk 58, i.e. depending on the distance between the at least one moving permanent magnet 62a, 62b and the axis R of the rotor 55, this may result in a holding torque, which is applied to the rotor 55, in the range of between 0.001 Nm and 0.01 Nm, in particular in a holding torque of approximately 0.005 Nm. This holding torque is multiplied by the reduction ratio of the reduction gear 16, so that a significantly larger holding torque is applied to the retractable light emission unit 12.

In a configuration, in which the aircraft headlight 2 comprises a plurality of moving permanent magnets and a plurality of stationary permanent magnets, not all moving permanent magnets need to be located vis-à-vis a corresponding stationary permanent magnet, when the retractable light emission unit 12 is arranged its operating position and when the retractable light emission unit 12 is arranged its stowed position, respectively.

Instead, the plurality of moving permanent magnets may comprise a first group of moving permanent magnets, which are located vis-à-vis the stationary permanent magnets of a corresponding first group of stationary permanent magnets, when the retractable light emission unit 12 is arranged its operating position; and the plurality of moving permanent magnets may comprise a second group of moving permanent magnets, which are located vis-à-vis the stationary permanent magnets of a corresponding second group of stationary permanent magnets, when the retractable light emission unit 12 is arranged its stowed position.

The first and second groups of permanent magnets may comprise the same number permanent magnets. Alternatively, the first groups of permanent magnets may comprise a different number of permanent magnets than the second groups of permanent magnets.

The plurality of moving permanent magnets may, for example, include two, three, four, five, six, seven or eight moving permanent magnets.

The plurality of stationary permanent magnets may, for example, include two, three, four, five, six, seven or eight stationary permanent magnets.

When one of the moving permanent magnets 62a, 62b is located vis-à-vis the stationary permanent magnet 60, a distance d between the moving permanent magnet in question and the stationary permanent magnet 60 may be in the range of between 0.3 mm and 4 mm, in particular in the range of between 0.5 mm and 2 mm. The distance d between the moving permanent magnet and the stationary permanent magnet in this range has been found as well suited for generating a sufficiently strong braking/holding force onto the rotor 55, in order to prevent an undesired movement of the retractable light emission unit 12, when it is arranged in its stowed position or in its operating position, respectively. At the same time, the braking/holding force may be sufficiently small, in order to reliably be overcome by the torque generated by the electric motor 14, when the electric motor 14 is activated.

Figure 4A:
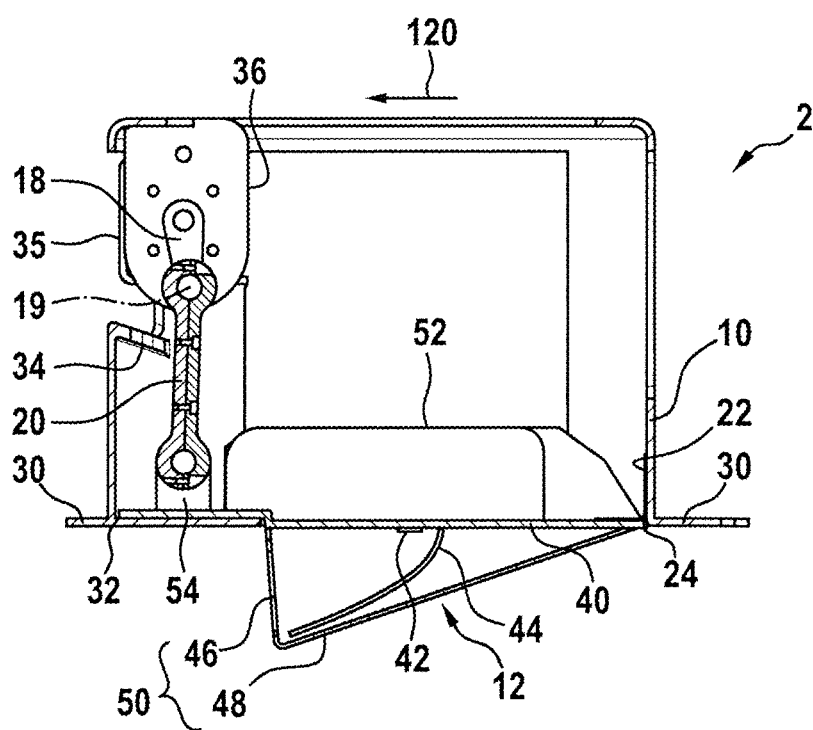
FIG. 4A shows a longitudinal cross-sectional view of the aircraft headlight of FIG. 2, with the retractable light emission unit being in the operating position.

FIG. 4A shows the aircraft headlight 2 of FIG. 2 in a longitudinal cross-sectional view. In particular, FIG. 4A shows a cross-sectional plane that is vertical in the aircraft frame of reference and that runs through the aircraft headlight 2 in a front-to-rear direction in the aircraft frame of reference. The position of the cross-sectional plane and the viewing direction are indicated by a dashed line and arrows B-B in FIG. 2.

In FIG. 4A, the retractable light emission unit 12 is shown in the operating position, as it is shown in FIGS. 2 and 3. The retractable light emission unit 12 is shown in more detail in FIG. 4A, as compared to FIGS. 2 and 3, and will be described in more detail as follows.

The retractable light emission unit 12 comprises a base plate 40. In the depicted operating position of FIG. 4A, the base plate 40 is substantially flush with the mounting ring 30 of the housing 10 and, thus, substantially flush with the skin of the aircraft.

On its lower side, the base plate 40 supports a plurality of light sources 42, one of which being positioned in the cross-sectional plane of FIG. 4A, and a plurality of reflectors 44, one of which being shown in the cross-sectional plane of FIG. 4A. Each reflector 44 may have a parabolic or other suitable shape for collimating the light output of the associated light source 42 in a desired direction. For example, the reflector 44 may collimate the light towards a landing target, in case the aircraft headlight 2 is a landing light, or may provide for a wider light output distribution, in case the aircraft headlight 2 is a taxi light or a runway-turnoff light. While being separate functional components, the plurality of reflectors 44 may be implemented as an integrally formed component. Instead of/in addition to the plurality of reflectors 44, the retractable light emission unit 12 may have other optical elements, such as one or more lenses and/or one or more shutters.

The aircraft headlight light output, as provided by the plurality of light sources 42 and the plurality of reflectors 44, leaves the aircraft headlight 2 through the light transmissive cover portion 46 of a cover arrangement 50. Besides the light transmissive cover portion 46, the cover arrangement 50 comprises a rearward cover portion 48. Together, the light transmissive cover portion 46 and the rearward cover portion 48 enclose the plurality of light sources 22 and the plurality of reflectors 44 and protect said components from the outside environment of the aircraft. The cover arrangement 50 is also supported by the base plate 40.

On its upper side, the base plate 40 supports a plurality of cooling ribs 52. In the depicted exemplary embodiment, the plurality of cooling ribs 52 are vertical cooling ribs and are arranged substantially parallel to each other.

As stated above, the aircraft headlight 2 comprises a spring steel sheet 22, which acts as a hinge between the housing 10 and the retractable light emission unit 12. In the depicted exemplary embodiment, the spring steel sheet 22 acts as a hinge between a rear wall of the housing 10 and the base plate 40 of the retractable light emission unit 12. It may therefore also be said that the retractable light emission unit 12 is rearward hinged in the depicted exemplary embodiment. For the sake of clarity that the spring steel sheet 22 is provided in a rear end portion of the housing 10, a flight direction of the aircraft is indicated via arrow 120.

In the depicted exemplary embodiment, the base plate 40 is vertically hinged with respect to the housing 10. The expression of the base plate 40 being vertically hinged means that a first portion of the spring steel sheet 22 is mounted to the base plate 40 and a second portion of the spring steel sheet 22 is mounted to a vertical wall of the housing 10. In the depicted operating position of the retractable light emission unit 12, the spring steel sheet 22 is bent at an angle of about 90° between the first portion, mounted to the base plate 40, and the second portion, mounted to the housing 10.

The spring steel sheet 22 is bent along a bending line 24. Said bending line 24 acts as a pivot axis, around which the base plate 40 may pivot with respect to the housing 10. Via said pivoting motion, the retractable light emission unit 12 may be moved between the stowed position and the operating position.

As stated above, the electric motor 14, as shown in FIG. 2, can move the retractable light emission unit 12 between the stowed position and the operating position via the crankshaft 18 and the connecting rod 20. The connecting rod 20 is coupled to a crankpin 19 of the crankshaft 18 with an upper bore/upper eye, provided at a first end portion of the connecting rod 20. Further, the connecting rod 20 is coupled to the base plate 40 via a mounting fixture 54. In particular, the connecting rod 20 is coupled to a connecting pin of the mounting fixture 54 with a lower bore/lower eye, provided at a second end portion of the connecting rod 20.

When in the operating position, as depicted in FIG. 4A, the base plate 40 rests against a first abutment surface 32 of the housing 10. In particular, a forward end portion of the base plate 40, which supports the mounting fixture 54, rests against the first abutment surface 32. In the operating position, the connecting rod 20 extends substantially orthogonal to the base plate 40. In this way, with the base plate 40 being oriented substantially horizontally, the connecting rod 20 is oriented substantially vertically in the operating position of the retractable light emission unit 12. In this position, the crankpin 19 is in the lower dead center, and a comparably large torque is required for starting to move the retractable light emission unit 12. Accordingly, the retractable light emission unit 12 is in a mechanically stable position and can withstand comparably large external forces with a low holding force/holding torque, without being pushed back into the housing 10.

Figure 4B:
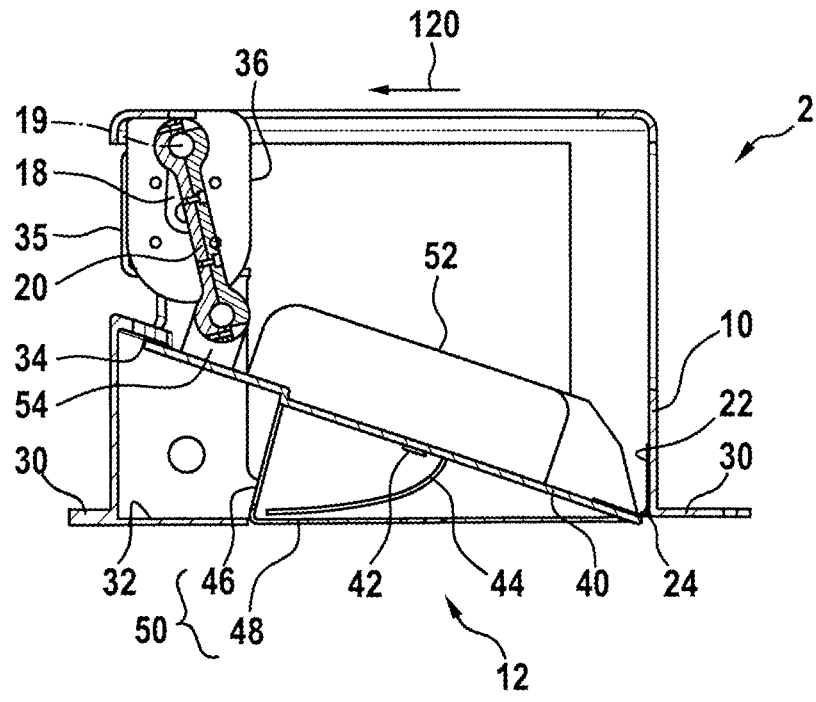
FIG. 4B shows the aircraft headlight of FIG. 2 in the longitudinal cross-sectional view of FIG. 4A, with the retractable light emission unit being in the stowed position.

FIG. 4B shows the aircraft headlight 2 of FIG. 2 in the same cross-sectional plane as FIG. 4A. However, FIG. 4B shows the aircraft headlight 2 with the retractable light emission unit 12 being in the stowed position.

In the stowed position, the rearward cover portion 48 of the cover arrangement 50 is substantially flush with the mounting ring 30 of the housing 10 and, thus, with the skin of the aircraft. The base plate 40 of the retractable light emission unit 12 extends into the inside of the housing 10 at an angle of about 20° with respect to the mounting ring 30. Accordingly, the spring steel sheet 22 is bent at an angle of about 70° along the bending line 24, when the retractable light emission unit 12 is in the stowed good position.

In the stowed position, as depicted in FIG. 4B, the forward end portion of the base plate 40 rests against a second abutment surface 34 of the housing 10. The crankpin 19 of the crankshaft 18 is in the upper dead center, when the retractable light emission unit 12 is in the stowed position. In this way, a mechanically highly stable position is achieved, and a comparably large torque is needed for starting to move the retractable light emission unit 12 out of the stowed position.

During the extraction and retraction of the retractable light emission unit 12, a combination of forces may act on the retractable light emission unit 12. These forces may include aero-drag, aero-lift, friction forces, and forces due to ice build-up. Also, bird strike events may lead to isolated force impacts. The configuration with the crankshaft 18 may provide for a force profile that matches the combination of expected forces particularly well. The crankshaft configuration may enable to hold the retractable light emission unit 12 in the fully extracted position and/or in the fully retracted position with a small holding force. Also, the crankshaft configuration may allow for applying a comparably large force to the retractable light emission unit 12 at the beginning of the extraction operation and/or at the beginning of the retraction operation. In this way, the combination of external forces, which is expected to be comparably high at the beginning of the extraction and retraction operations, may be overcome in a particularly good manner.

The configuration with the crankshaft 18 and the resulting force profile may be supplemented by a pre-loading of the retractable light emission unit 12 via the spring steel sheet 22. Said pre-loading may have a smoothening effect on the combination of the external forces and may help to prevent rattling of the retractable light emission unit 12. The pre-loading may provide for a desired bias towards the operating position of the retractable light emission unit 12.

The retractable light emission unit 12 may be provided with high mechanical stability, while having a very low profile/height extension. It is possible that the portion of the retractable light emission unit 12 that extends downwards from the skin of the aircraft, when the retractable light emission unit 12 is in the operating position, is less than 60 mm in height, in particular less than 50 mm in height, further in particular less than 40 mm in height, yet further in particular between 20 mm and 40 mm in height.

Figure 5A:
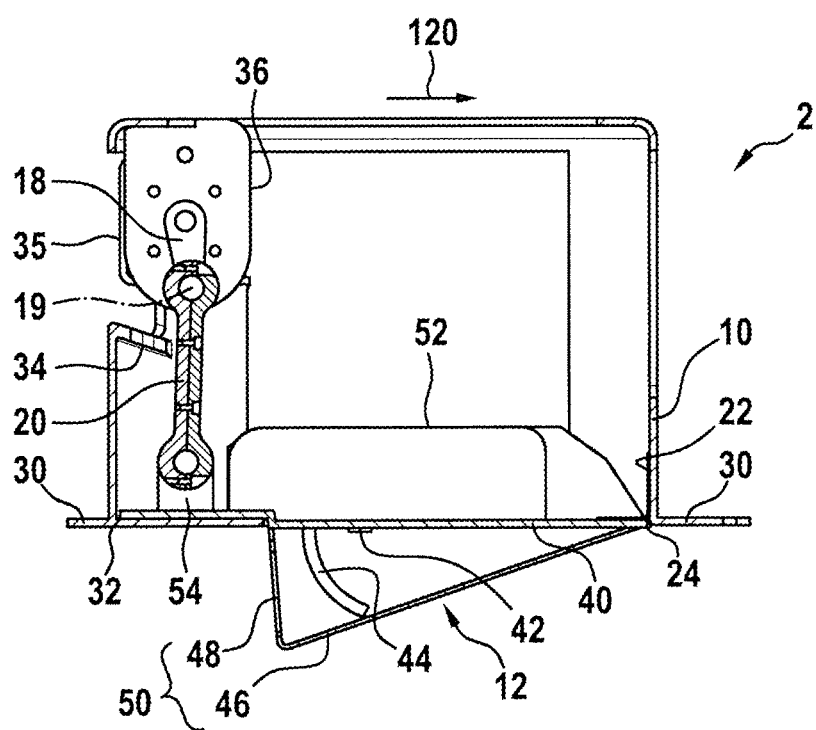
FIG. 5A shows an aircraft headlight in accordance with a second exemplary embodiment of the invention in a longitudinal cross-section view, corresponding to the view of FIG. 4A, with the retractable light emission unit being in the operating position.

FIG. 5A shows an aircraft headlight 2 in accordance with a second exemplary embodiment of the invention in a longitudinal cross-sectional view. The cross-sectional plane of FIG. 5A is analogous to the cross-sectional plane of FIG. 4A. In FIG. 5A, the aircraft headlight 2 is depicted with the retractable light emission unit being in the operating position. The aircraft headlight 2 of FIG. 5A is very similar to the aircraft headlight described above with respect to FIGS. 2, 3, 4A, and 4B. Corresponding elements are denoted with the same reference numerals, and reference is made to their description above.

The aircraft headlight 2 of FIG. 5A differs from the aircraft headlight of FIGS. 2, 3, 4A, and 4B with respect to its mounting orientation in the aircraft. In particular, the movable portion of the base plate 40 is towards the rear of the aircraft headlight 2. Also, the electric motor, the crankshaft 18, and the connecting rod 20 are arranged towards the rear of the aircraft headlight 2. This is also indicated via the reversed flight direction 120, as compared to FIG. 4A.

With the mounting orientation being reversed, the mounting plate 40 of the retractable light emission unit 12 of FIG. 5A is forward hinged. The retractable light emission unit 12 of FIG. 5A has a more extended light transmissive cover portion 46 and a smaller rearward cover portion 48. The light transmissive cover portion 46 of the retractable light emission unit 12 has a smaller angle with respect to the impinging air stream in flight. This may be beneficial in some application scenarios, inter alia depending on the intended speeds at which the aircraft headlight may be used.

In order to pass the aircraft headlight light output through the extended light transmissive cover portion 46 of the exemplary embodiment of FIG. 5A, the set-up of the plurality of light sources 42 and the plurality of reflectors 44 is different, as compared to the set-up shown in FIG. 4A. In particular, the plurality of light sources 42 are arranged more towards the movable end of the base plate 40 and the plurality of reflectors 44 extend from the base plate 40 in a steeper manner. In this way, the light from the plurality of light sources 42 may be directed in desired output directions and a large portion of the light may be passed through the the light transmissive cover portion 46. The plurality of reflectors 44 may be parabolic in shape, however with a different kind of parabolic shape as compared to the plurality of reflectors of the exemplary embodiment of FIGS. 4A and 4B.

Figure 5B:
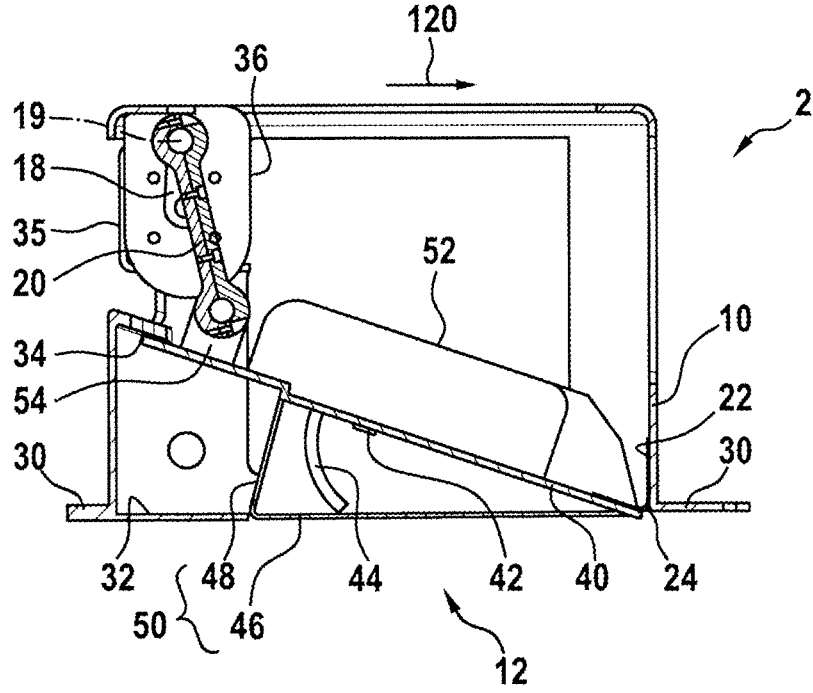
FIG. 5B shows the aircraft headlight of FIG. 5A in the same longitudinal cross-sectional view as FIG. 5A, with the retractable light emission unit being in the stowed position.

FIG. 5B shows the aircraft headlight of FIG. 5A in the same longitudinal cross-sectional view as FIG. 5A, with the retractable light emission unit being in the stowed position. With respect to the movement between the operating position and the stowed position, reference is made to the description of FIGS. 4A and 4B above.

Figure 6A:
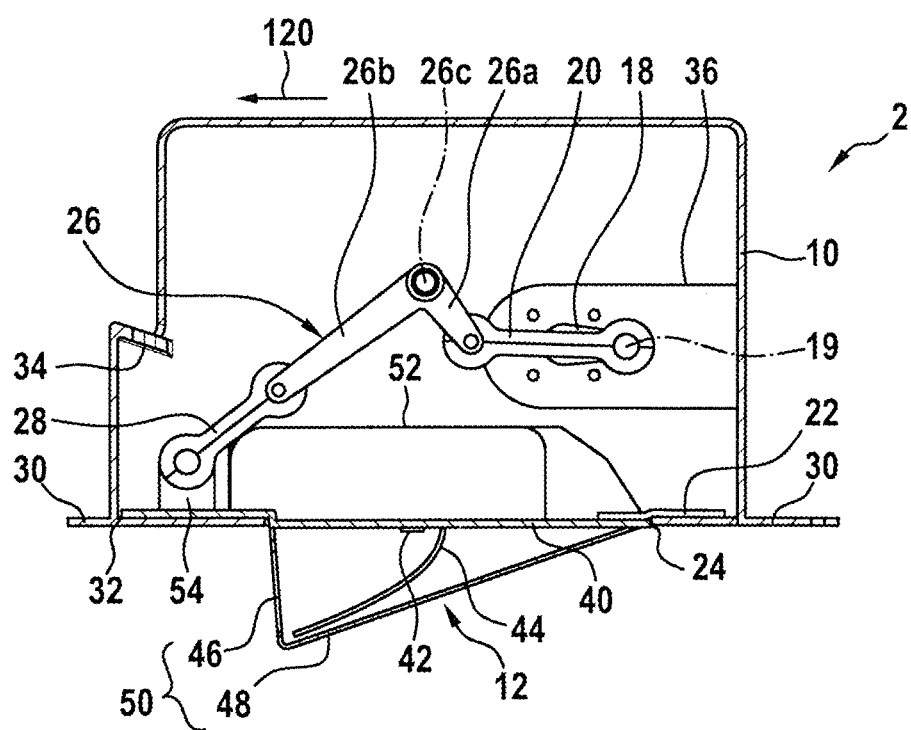
FIG. 6A shows an aircraft headlight in accordance with a third exemplary embodiment of the invention in a longitudinal cross-section view, corresponding to the view of FIG. 4A, with the retractable light emission unit being in the operating position.

FIG. 6A shows an aircraft headlight 2 in accordance with a third exemplary embodiment of the invention in a longitudinal cross-sectional view. The cross-sectional plane of FIG. 6A is analogous to the cross-sectional plane of FIG. 4A. In FIG. 6A, the aircraft headlight 2 is depicted with the retractable light emission unit being in the operating position. The aircraft headlight 2 of FIG. 6A has many components that are similar to the aircraft headlight described above with respect to FIGS. 2, 3, 4A, and 4B. Corresponding elements are denoted with the same reference numerals, and reference is made to their description above.

In the exemplary embodiment of FIG. 6A, the crankshaft 18 is not coupled to the base plate 40 via a single connecting rod. Rather, the crankshaft 18 is coupled to a bell crank 26 via a first connecting rod 20, and the bell crank 26 is coupled to the mounting fixture 54 of the base plate 40 via a second connecting rod 28. In the exemplary embodiment of FIG. 6A, the bell crank 26 has a first leg 26a and a second leg 26b. The first leg 26a and the second leg 26b are angled in a substantially orthogonal manner with respect to each other. The bell crank 26 is supported in the housing 10 in a rotational manner at a center axis 26c. The first leg 26a and the second leg 26b can rotate around the center axis 26c.

Via the bell crank 26, the motion of the first connecting rod 20 may be transferred into a motion of the second connecting rod 28 with a change in motion angle. Due to this change in motion angle, the crankshaft 18 and the first connecting rod 20 can have different positions within the housing, as compared to the positions of the crankshaft 18 and the connecting rod 20 in the exemplary embodiment of FIGS. 2, 3, 4A, and 4B.

In the exemplary embodiment of FIG. 6A, the electric motor and the crankshaft 18 are arranged above the fixed portion of the base plate 40. When the retractable light emission unit 12 is in the depicted operating position, the first connecting rod 20 is substantially aligned with the base plate 40. It can also be said that the first connecting rod 20 is substantially in parallel with the bade plate 40. The crankshaft 18 is in its first dead center, when the retractable light emission unit 12 is in the depicted operating position.

As compared to the exemplary embodiment of FIGS. 2, 3, 4A, and 4B, the electric motor and the crankshaft 18 are closer to the bottom portion of the housing 10 and are supported from a side wall of the housing 10. In this way, the housing 10 of the exemplary embodiment of FIG. 6A may have a lower height than the housing of the exemplary embodiment of FIGS. 2, 3, 4A, and 4B.

The bell crank 26 may serve a dual purpose. On the one hand, the bell crank 26 may facilitate a particularly low height of the aircraft headlight 2. On the other hand, the bell crank 26 may enable a desired adaptation of the forces along the coupling between the crankshaft 18 and the base plate 40 via the ratio of the lengths of the first leg 26a and the second leg 26b.

Figure 6B:
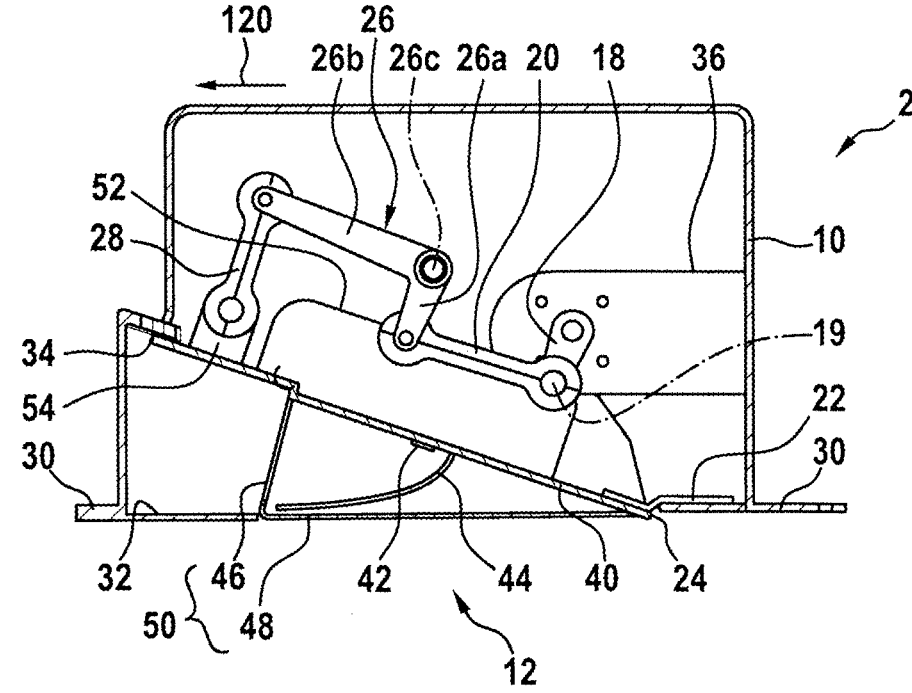
FIG. 6B shows the aircraft headlight of FIG. 6A in the same longitudinal cross-sectional view as FIG. 6A, with the retractable light emission unit being in the stowed position.

FIG. 6B shows the aircraft headlight of FIG. 6A in the same longitudinal cross-sectional view as FIG. 6A, with the retractable light emission unit being in the stowed position. It can be seen from FIG. 6B that the first connecting rod 20 is also substantially aligned with the base plate 40, when the retractable light emission unit 12 is in the depicted stowed position. The crankpin 19 of the crankshaft 18 is in its second dead center, when the retractable light emission unit 12 is in the depicted stowed position. In operation, the motion of the first connecting rod 20 moves the first leg 26a of the bell crank, which in turn moves the second leg 26b of the bell crank, which in turn moves the second connecting rod 28, and thus moves the retractable light emission unit 12 between the operating position and the stowed position.

In the depicted exemplary embodiment of FIGS. 6A and 6B, the base plate 40 is horizontally hinged with respect to the housing 10. The expression of the base plate 40 being horizontally hinged means that a first portion of the spring steel sheet 22 is mounted to the base plate 40 and a second portion of the spring steel sheet 22 is mounted to a horizontal wall/horizontal portion of the housing 10. In the operating position of the retractable light emission unit 12, the spring steel sheet 22 is stretched out in a substantially flat manner along a portion of the base plate 40 and a horizontal portion of the housing 10. In the stowed position of the retractable light emission unit 12, the spring steel sheet 22 is angled at an angle of about 20° at the bending line 24.

Figure 7A:
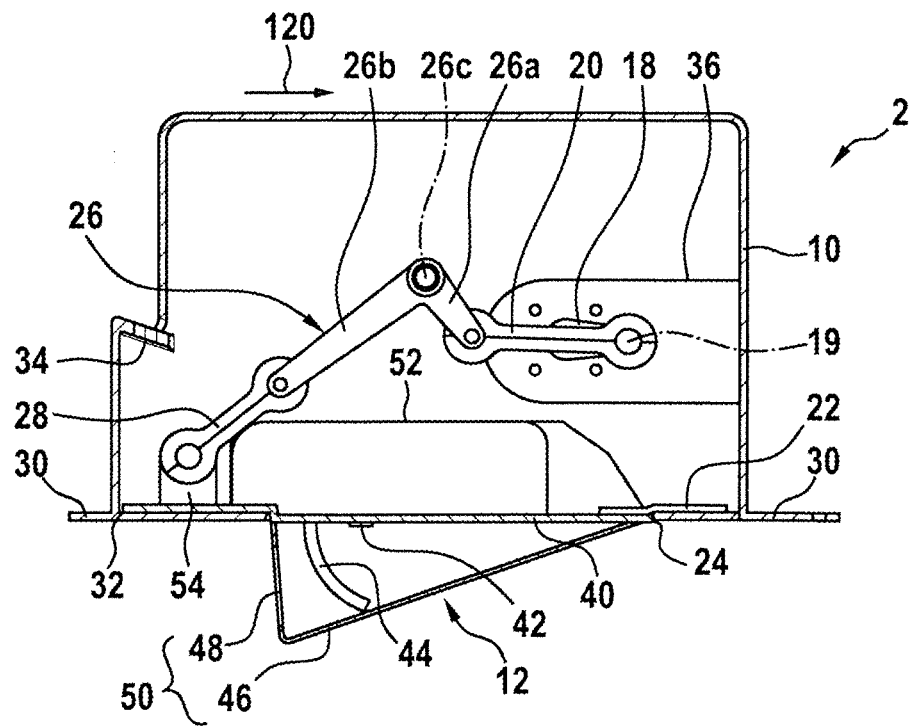
FIG. 7A shows an aircraft headlight in accordance with a fourth exemplary embodiment of the invention in a longitudinal cross-section view, corresponding to the view of FIG. 4A, with the retractable light emission unit being in the operating position.

FIG. 7A shows an aircraft headlight 2 in accordance with a fourth exemplary embodiment of the invention in a longitudinal cross-sectional view. The cross-sectional plane of FIG. 7A is analogous to the cross-sectional plane of FIG. 4A. In FIG. 7A, the aircraft headlight 2 is depicted with the retractable light emission unit being in the operating position. The aircraft headlight 2 of FIG. 7A is very similar to the aircraft headlight described above with respect to FIGS. 6A and 6B. Corresponding elements are denoted with the same reference numerals, and reference is made to their description above.

Figure 7B:
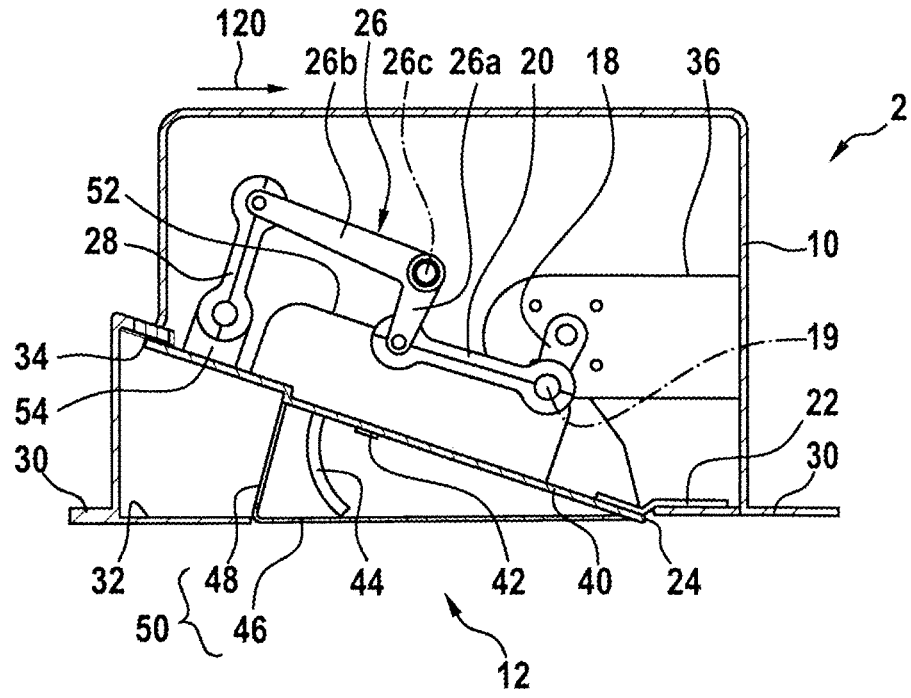
FIG. 7B shows the aircraft headlight of FIG. 7A in the same longitudinal cross-sectional view as FIG. 7A, with the retractable light emission unit being in the stowed position.

FIG. 7B shows the aircraft headlight of FIG. 7A in the same longitudinal cross-sectional view as FIG. 7A, with the retractable light emission unit being in the stowed position. With respect to the movement between the operating position and the stowed position, reference is made to the description of FIGS. 6A and 6B above.

The aircraft headlight 2 according to the exemplary embodiment of FIGS. 7A and 7B differs from the aircraft headlight 2 according to the exemplary embodiment of FIGS. 6A and 6B in the same manner as the aircraft headlight 2 according to the exemplary embodiment of FIGS. 5A and 5B differs from the aircraft headlight 2 according to the exemplary embodiment of FIGS. 4A and 4B. Reference is made to the description of FIGS. 5A and 5B above, with the discussed differences applying to the exemplary embodiment of FIGS. 7A and 7B in an analogous manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft headlight, comprising:
 a housing;
 a mounting ring coupled to the housing;
 a base plate;
 a retractable light emission unit coupled to the base plate, wherein the retractable light emission unit is movable with respect to the housing between a stowed position and an operating position, the base plate disposed within the housing at an angle to the mounting ring in response to the retractable light emission unit being in the stowed position, and the base plate at least partially abutting the mounting ring in response to the retractable light emission unit being in the operating position;
 a spring steel sheet disposed within the housing and coupled between the housing and the base plate, the spring steel sheet operable as a hinge and configured to move the retractable light emission unit between the stowed position and the operating position; and
 an electric motor disposed at least partially within the housing;
 the electric motor comprising:
  a casing, which is stationary with respect to the housing, and
  a rotor, which is rotatable with respect to the casing and which is mechanically coupled to the retractable light emission unit for moving the retractable light emission unit between the stowed position and the operating position by rotating the rotor;
 at least one stationary magnet, which is attached to the casing; and
 at least one moving permanent magnet, which is attached to the rotor such that, in at least one rotational position of the rotor, the at least one moving permanent magnet is located vis-à-vis the at least one stationary magnet;

wherein the at least one stationary magnet and the at least one moving permanent magnet have such polarities that the at least one stationary magnet and the at least one moving permanent magnet exert a magnetic holding force onto the rotor, when the at least one moving permanent magnet is located vis-à-vis the at least one stationary magnet.

2. The aircraft headlight according to claim 1, wherein a distance (d) between the at least one stationary magnet and the at least one moving permanent magnet is in the range of between 0.3 mm and 4 mm, in particular in the range of between 0.5 mm and 2 mm, when the at least one moving permanent magnet is located vis-à-vis the at least one stationary magnet.

3. The aircraft headlight according to claim 1, wherein the at least one stationary magnet is mounted to an outer surface of the casing, and wherein the at least one moving permanent magnet is mounted to a portion of the rotor, which is outside of the casing.

4. The aircraft headlight according to claim 1, wherein the rotor comprises a rotating disk, which is supported by a rotational shaft of the rotor, and wherein the rotating disk supports the at least one moving permanent magnet.

5. The aircraft headlight according to claim 1, wherein the at least one moving permanent magnet comprises a plurality of moving permanent magnets; wherein the plurality of moving permanent magnets in particular comprise two, three, four, five, six, seven or eight moving permanent magnets.

6. The aircraft headlight according to claim 5, wherein the plurality of moving permanent magnets are arranged at equal angular distances with respect to a rotational axis (R) of the rotor.

7. The aircraft headlight according to claim 1, wherein the at least one stationary magnet comprises a plurality of stationary magnets; wherein the plurality of stationary magnets in particular comprise two, three, four, five, six, seven or eight stationary magnets.

8. The aircraft headlight according to claim 1, further comprising a reduction gear disposed within the housing, wherein the rotor of the electric motor is mechanically coupled to the retractable light emission unit via the reduction gear.

9. The aircraft headlight according to claim 8, wherein the reduction gear has a reduction ratio in the range of between 1:100 and 1:1000, wherein the reduction gear in particular has a reduction ratio of between 1:300 and 1:700, wherein the reduction gear further in particular has a reduction ratio of about 1:500.

10. The aircraft headlight according to claim 8, wherein the reduction gear is arranged on a first side of the electric motor and the at least one stationary magnet and the at least one moving permanent magnet are arranged on a second side of the electric motor.

11. The aircraft headlight according to claim 1, further comprising:

a crankshaft, coupled to the electric motor and coupled to the retractable light emission unit via a connecting rod;

wherein the electric motor is configured to move the retractable light emission unit between the stowed position and the operating position via the crankshaft and the connecting rod.

12. The aircraft headlight according to claim 11, wherein the crankshaft is coupled to the retractable light emission unit via a single connecting rod;

or wherein the aircraft headlight comprises a bell crank, wherein the crankshaft is coupled to the bell crank via a first connecting rod, and wherein the bell crank is coupled to the retractable light emission unit via a second connecting rod.

13. The aircraft headlight according to claim 1, wherein the aircraft headlight is a take-off light or a landing light or a runway turn-off light or a taxi light or a multi-functional aircraft headlight, comprising the functionalities of at least two of a take-off light, a landing light, a runway turn-off light and a taxi light.

14. An aircraft, such as an airplane, comprising at least one aircraft headlight according to claim 1.

15. A method of moving retractable light emission unit of an aircraft headlight according to claim 1 by operating the electric motor for rotating the rotor from a start position, which corresponds to the stowed position of the retractable light emission unit, into an end position, which corresponds to the operating position of the retractable light emission unit; and/or operating the electric motor for rotating the rotor from a start position, which corresponds to the operating position of the retractable light emission unit, into the end position, which corresponds to the stowed position of the retractable light emission unit;

wherein in at least one of the start position and the end position, the at least one moving permanent magnet is located vis-à-vis the at least one stationary magnet.

16. The aircraft headlight according to claim 1, wherein the base plate supports a plurality of cooling ribs configured to distribute heat generated in response to operation of the retractable light emission unit.

*    *    *    *    *